US008712158B2

(12) United States Patent
Bharath et al.

(10) Patent No.: US 8,712,158 B2
(45) Date of Patent: Apr. 29, 2014

(54) KEYPOINT DESCRIPTOR GENERATION BY COMPLEX WAVELET ANALYSIS

(75) Inventors: Anil Anthony Bharath, London (GB); Jeffrey Ng Sing Kwong, London (GB)

(73) Assignee: Cortexica Vision Systems Limited, London (GB)

( * ) Notice: Subject to any disclaimer, the term of this patent is extended or adjusted under 35 U.S.C. 154(b) by 461 days.

(21) Appl. No.: 13/127,901

(22) PCT Filed: Nov. 5, 2009

(86) PCT No.: PCT/EP2009/064716
§ 371 (c)(1),
(2), (4) Date: Jul. 7, 2011

(87) PCT Pub. No.: WO2010/052284
PCT Pub. Date: May 14, 2010

(65) Prior Publication Data
US 2011/0262041 A1 Oct. 27, 2011

(30) Foreign Application Priority Data
Nov. 5, 2008 (GB) .................................. 0820273.1

(51) Int. Cl.
*G06K 9/46* (2006.01)
(52) U.S. Cl.
CPC .................... *G06K 9/4671* (2013.01)
USPC ......................................................... 382/190
(58) Field of Classification Search
CPC ... G06T 1/0057; G06T 1/0064; G06T 3/4084; G06T 5/10; G06T 2207/20064; G06T 7/0036; G06T 7/0097; G06T 7/402; G06T 7/0095; G06T 7/206; G06K 9/4671
USPC .................. 382/190–195, 232–253
See application file for complete search history.

(56) References Cited

U.S. PATENT DOCUMENTS 6,711,293 B1   3/2004   Lowe
7,450,745 B2 * 11/2008   Dowski et al. ................ 382/128
(Continued)

FOREIGN PATENT DOCUMENTS

WO         2008/020068 A1     2/2008

OTHER PUBLICATIONS

Bharath et al., "A Steerable Complex Wavelet Construction and Its Application to Image Denoising," IEEE Transactions on Image Processing, IEEE Service Center, Piscataway, NJ, vol. 14, No. 7, Jul. 1, 2005.

(Continued)

*Primary Examiner* — Brian Le
(74) *Attorney, Agent, or Firm* — EIP US LLP

(57) ABSTRACT

The present invention relates to a method of generating a keypoint descriptor for identifying an object in an image or in a sequence of images, the keypoint descriptor being substantially invariant to a transformation of the object in the image. The method includes receiving object data representing an object for identification in an image; processing said object data to generate at least one basis function representing a feature having undergone at least one transformation or a transformation sequence across several consecutive frames, optionally using transformations that are out of the image plane to recognize objects from multiple views; modifying a prototype wavelet function based on said at least one basis function to generate a plurality of modified wavelet functions; comparing the plurality of modified wavelet functions with the at least one basis function; selecting a modified wavelet function of said plurality of modified wavelet functions based on the comparison of the plurality of modified wavelet functions with the at least one basis function; and processing an input image or input orientation field according to said selected modified wavelet function to generate the keypoint descriptor. The present invention further relates to a method of identifying an object in an image using a keypoint descriptor; and apparatus and computer software for implementing a method in accordance with the present invention.

44 Claims, 9 Drawing Sheets

(56) References Cited

U.S. PATENT DOCUMENTS

2002/0010704 A1  1/2002  Kim et al.
2009/0190850 A1* 7/2009  Tang .............................. 382/251

OTHER PUBLICATIONS

Bharath et al., "Phase Invariant Keypoint Detection," 15th International Conference on Digital 25 Signal Processing, DSP 2007.
Ke et al., "PCA-SIFT: A More Distinctive Representation for Local Image Descriptors," School of Computer Science, Carnegie Mellon University, Intel REsearch Pittsburgh, http://www.cs.cmu.edu/~yke/pcasift/.
Kingsbury, N.G., "Rotation-Invariant Local Feature Matching with Complex Wavelets," European Signal Processing conference, Sep. 4, 2006-Sep. 8, 2006.
Nister et al., "Scalable Recognition with a Vocabulary Tree," Center for Visualization and Virtual Environments, Department of Computer Science, University of Kentucky, http://ww.vis.uky.edu/~nister/ and http://vis.uky.edu/~stewe/.
Remi et al., "Accelerated Keypoint Extraction," Ninth International Workshop on Image Analysis for Multimedia Interactive Services, IEEE Computer Society, Downloaded on Feb. 18, 2009, pp. 183-186.
Selesnick et al., "The Dual-Tree Complex Wavelet Transform," IEEE Signal Processing Magazine, IEEE Service Center, Piscataway, NJ, vol. 22, No. 6, Nov. 1, 2005, pp. 123-151.
Sivic et al., "Video Google: Efficient Visual Search of Videos," Department of Engineering Science, University of Oxford, Oxford, OX1 3PJ1 {josef,az}@robots.ox.ac.uk and http://www.robots.ox.ac.uk/~vgg.

* cited by examiner

KEYPOINT DESCRIPTOR GENERATION BY COMPLEX WAVELET ANALYSIS

FIELD OF THE INVENTION

The present invention relates to improvements in the field of image processing. The present invention further relates to a method of image processing, and apparatus and computer software for implementing the methods of the invention.

BACKGROUND OF THE INVENTION

In the field of computer vision one distinctive and complex task is image analysis and object recognition. A number of methods have been developed to address this task, which include: angular radial transform (ART); scale invariant feature transformation (SIFT); principal component analysis-scale invariant feature transformation (PCA-SIFT); and gradient location and orientation histogram (GLOH).

The method of ART disclosed in patent publication no. US 2002/0010704 describes a method of generating a descriptor for a complete image. This method has the disadvantage of not being able to account for occlusion or objects within an image. To overcome this disadvantage, a number of methods such as SIFT have been developed which include processing image data to identify a number of highly distinctive features or keypoints in an image.

The method of scale invariant feature transformation (SIFT) disclosed in U.S. patent Application Ser. No. 6,711,293 is a well known technique that comprises two distinctive parts: (1) keypoint detection, which identifies visually distinctive locations in a digital image; and (2) generation of a keypoint descriptor, which characterises a region or patch around the keypoint.

Generation of the keypoint descriptor in the SIFT method includes the step of orientation assignment using histograms to determine the dominant orientation(s). When there are two or more equally dominant orientations in an image region around the keypoint, which is the case in almost any image region containing complex imagery, additional keypoints and descriptors are required to be generated for each of the additional dominant orientations detected.

In addition, to generate the keypoint descriptor, it is necessary to generate a vector descriptor for each of the keypoints generated; this step also uses histograms. Therefore a problem with the SIFT method is the large amount of processing that is required to generate a keypoint descriptor that has an invariance to rotation.

Alternative methods that have been developed from SIFT are PCA-SIFT and GLOH. PCA-SIFT uses similar steps as in SIFT, however instead of using weighted histograms to form the descriptor, PCA-SIFT uses principal component analysis (PCA). An example of PCA-SIFT may be found in the publication entitled "PCA-SIFT: A More Distinctive Representation for Local Image Descriptors" by Yan Ke and Rahul Sukthankar. GLOH is yet another alternative method to SIFT, and is again based on the SIFT method, but utilises more spatial regions in the histograms. The resultant descriptor, which is dimensionally higher than that created using SIFT, is then reduced using PCA.

A problem with all of the above methods is that whilst they may be apt at object detection in still images they require a large number of keypoints and they have not been created to tackle the problems that would be encountered in object detection in a series of images such as video applications.

The problem with object detection in video, and for example video on the internet, is that video has a number of varying attributes that must be considered when performing computational analysis of several consecutive images to detect an object; for example: 1) bit rate and encoding method, and therefore quality and video compression artefacts; 2) resolution; and 3) colour balance.

Whilst much of these effects are not very noticeable to a human observer, this is because current video encoding systems rely on persistence of vision of the human visual system; they do, however, raise a significant problem for computational algorithmic analysis of the video frames.

An example of the problems that may occur in video, in respect of estimating keypoint motion from an image frame to a consecutive image frame, is shown in FIGS. 1a, 1b and 1c. Referring to FIG. 1a there are shown three consecutive frames 10a, 10b and 10c in time having the same keypoint identified as 12a, 12b and 12c, respectively, in the different frames. A line A-A passing through the centre of the keypoint 12a in the first frame 10a passes through the corresponding pixel in frames 10b and 10c; the keypoint in frames 10b and 10c deviates from the line A-A. FIG. 1a therefore illustrates how the pixel location of a keypoint may move from one frame to next frame in video.

Referring to FIG. 1b there are shown three consecutive frames 14a, 14b and 14c and two possible motion paths 18, 19 that an image patch 16a may take. In a first possible motion path 18 it can be seen that the image patches 16b and 16c in respective second and third frames 14b and 14c are located higher in each of the respective frames than image patches 16b' and 16c' shown in the second possible motion path 19.

Referring to FIG. 1c there are illustrated three consecutive frames 20a, 20b and 20c. In the middle frame 20b there is an image patch 22 having a keypoint 24. The keypoint 24' and 24" on respective first and third frames 20a and 20c on either side of the middle frame 20b show a possible motion path of the keypoint 24 along a bi-conical surface.

Referring to FIG. 2 there is shown an example of three consecutive images, running from left to right of FIG. 2, which together form a video sequence illustrating fine variability. These images show the degree of variation in each of the frames. The feature labelled 26 has been marked in each of the consecutive frames. It can be seen that the feature 26 near the right hand side of the images appears to move to the lower right hand corner for the consecutive frames.

The problems in accurately identifying an object in consecutive video images that can arise from movement of a keypoint location in one frame compared with another frame is not addressed by the prior art.

It is an object of the present invention to provide improvements in relation to image and video processing.

SUMMARY OF THE INVENTION

In accordance with a first aspect of the present invention, there is provided a method of generating a keypoint descriptor for identifying an object in an image or in a sequence of images, the keypoint descriptor being substantially invariant to a transformation of the object in the image, wherein the method includes:

a) receiving object data representing an object for identification in an image;

b) processing said object data to generate at least one basis function representing a feature having undergone at least one transformation or a transformation sequence across several consecutive frames, optionally using transformations that are out of the image plane to recognise objects from multiple views;

c) modifying a prototype wavelet function being based on said at least one basis function to generate a plurality of modified wavelet functions;

d) comparing the plurality of modified wavelet functions with the at least one basis function;

e) selecting a modified wavelet function of said plurality of modified wavelet functions based on the comparison of step d); and f) processing an input image or input orientation field according to said selected modified wavelet functions to generate the keypoint descriptor.

This method allows keypoints of an object to be identified and learned, and stored to create a reliable database of keypoint descriptors that can be used for object identification in an image. A keypoint is a distinctive location in an image that can be robustly localised from a range of viewpoints, rotation, scale, illumination, etc. The keypoint descriptor generated by the method of the invention is substantially invariant to a transformation of the object, for example a rotation and/or a translation. The rotation may be in a two-dimensional plane, or in three-dimensions. The translation may be between images in a sequence of images. Substantially invariant means that the keypoint descriptor generated by the method of the invention is suitable for identifying a keypoint in an image under analysis, to identify an object in the image for example, within acceptable tolerances for an image processing application. Therefore, the keypoint descriptor generated by the method of the invention provides accurate and high quality object identification in images, with any transformation of the object for identification having a reduced or no detrimental effect on the quality of object identification.

The comparing and selecting steps of the invention allow a modified wavelet function which best matches the at least one basis function to be selected. In this way, the generated keypoint descriptor may be selected to correspond as closely as possible to the generated at least one basis function whilst having the substantial invariance and ease of specification of the modified wavelet function.

The method of the invention facilitates generation of a keypoint descriptor quicker, compared with prior art techniques such as SIFT, due to reduced computer processing requirements. Further, the keypoint descriptor is generated by the invention by means of inner product operations, for which there are optimised software libraries and hardware implementations unlike prior art systems such as SIFT. Advantageously, the method of the present invention is applicable to generate a keypoint descriptor for identifying an object in a single, non-video, image. The object may be two-dimensional or three-dimensional, in a two- or three-dimensional image, respectively. The present invention may also be used to identify an object in a series of images spaced over time, which form a video. The present invention may therefore be implemented to improve detectability of, for example, objects, logos and/or brands in video where movement of an object for example due to panning needs to be taken into consideration, as a keypoint for an object may not be in the same pixel location in each frame. The present invention method is therefore highly versatile for image processing techniques.

In one embodiment of the present invention the keypoint descriptor may be arranged to identify an object in a single image. The object may be a two-dimensional or three-dimensional object in a two-dimensional image.

Preferably, the prototype wavelet function and the plurality of modified wavelet functions, which are used to compute the keypoint descriptor, include a radial distance component and an azimuthal angle component.

The prototype wavelet function and the plurality of modified wavelet functions may have the formula:

$$\Psi_k(d,\theta) = d^{n_k-1} e^{-\alpha_k d}(n_k - \alpha_k d) \cdot (\cos(m_k\theta) + q_x \sin(m_k\theta))$$

where the term $d^{n_k-1} e^{-\alpha_k d}(n_k - \alpha_k d)$ is the radial distance weighting component and the term $(\cos(m_k\theta) + q_x \sin(m_k\theta))$ is the azimuthal angle component, and where the term $q_x$ denotes an imaginary unit.

In an alternative embodiment of the present invention the object may be a three dimensional object in a three dimensional volumetric data. The keypoint descriptor may also be arranged to identify an object in a series of images spaced over time.

The prototype wavelet function and the plurality of modified wavelet functions may comprise a radial distance component, an azimuthal angle component and a polar angle component, which can be an elevation or temporal angle component for three dimensional volumes or image sequences respectively.

The prototype wavelet function and the plurality of modified wavelet functions may have the formula:

$$\Psi_k(d,\theta,\phi) = d^{n_k-1} e^{-\alpha_k d}(n_k - \alpha_k d) \cdot (\cos(m_k\theta) + q_x \sin(m_k\theta)) \cdot (\cos(l_k\phi) + q_y \sin(l_k\phi))$$

where the term $d^{n_k-1} e^{-\alpha_k d}(n_k - \alpha_k d)$ is the radial distance component with radial element d, the term $(\cos(m_k\theta) + q_x \sin(m_k\theta))$ is the azimuthal angle component with azimuthal angle $\theta$, and the term $(\cos(l_k\phi) + q), \sin(l_k\phi))$ is the polar angle component with polar angle $\phi$, and where the terms $q_x$ and $q_y$ denote unit quaternions and obey the rules $q_x^2 = q_y^2 = q_z^2 = -1$, and $q_x q_y = q_z$.

Preferably, the prototype wavelet function and the modified wavelet functions comprise a non-linear weighting of the radial distance component. The non-linear weighting may represent a radial decay.

In a preferred embodiment the prototype wavelet function and the modified wavelet functions are quaternion wavelet functions.

Preferably, the keypoint is arranged to identify an object in an image patch.

The transformation may comprise a rotation. Alternatively, the transformation comprises a translation. The transformation could also be any other geometric transformation or any combination thereof.

Preferably, the wavelet functions can be optimised for specific categories of images such as natural images, video broadcasts, internet video clips. At least one basis function is an eigenfunction obtained from examples of the image category.

In one embodiment the modifying step may be performed in accordance with the formula:

$$\alpha_k, m_k, n_k, l_k = \underset{\substack{\alpha_k, m_k, n_k, l_k \\ v=0,1,2,3}}{\arg\min} \left[ \|\text{Re}\{S(v)\hat{\psi}_k(d,\theta,\phi;n_k,m_k,l_k,\alpha_k)\} - \psi_j\|_2 \right]$$

where $S(v) = \delta(v) - \delta(v-1)q_x - \delta(v-2)q_y - \delta(v-3)q_z$,

Preferably, the comparing step includes matching at least one of the modified wavelet functions with the at least one basis function, and the selected modified wavelet function is selected according to matching criteria.

Preferably, the processing step b) includes generating a plurality of basis functions, the comparing step includes matching a number of the plurality of basis functions with at least one of the modified wavelet functions, and the selecting step includes selecting a modified wavelet function for each of the number of the plurality of basis functions according to matching criteria.

Preferably, the keypoint descriptor is generated on the basis of the selected wavelet functions.

In accordance with a second aspect of the present invention there is provided a method of identifying an object in an image, the method including processing image data representing at least part of said image with a keypoint descriptor generated using the method of the first aspect of the present invention.

Preferably, the method of identify an object in an image includes:

i) receiving said image data;

ii) processing said image data to generate at least one keypoint descriptor representative of at least one keypoint of said image;

iii) comparing the keypoint descriptor generated in the method of the first aspect of the present invention with the at least one keypoint descriptor generated in step ii); and iv) determining if said at least one keypoint descriptor generated in step ii) matches the keypoint descriptor generated in the method of the first aspect of the present invention.

Advantageously, the method of identifying the object includes estimating transformation parameters of the object in the input image or input orientation field from the keypoint descriptor generated in the method of the present invention.

In yet a further aspect of the present invention there is provided apparatus arranged to perform the method of the present invention and a data carrier storing the computer software of the present invention.

Further features and advantages of the invention will become apparent from the following description of preferred embodiments of the invention, given by way of example only, which is made with reference to the accompanying drawings.

DETAILED DESCRIPTION OF THE INVENTION

Embodiments of the present invention provide a method of identifying a feature or an object in an image, and in particular embodiments of identifying an object in a series of images spaced over time, using a keypoint descriptor generated in accordance with the present invention.

Image Processing Apparatus

In embodiments of the method of the invention to be described the keypoint descriptor generated by the present invention is used to identify an object in an image, the method being performed by computer software which the image processing apparatus is arranged to run. The keypoint descriptor generated according to the invention may also be generated using computer software running on the image processing apparatus. The computer software may be stored on a suitable data carrier such as a compact disc (CD).

Figure 1A:
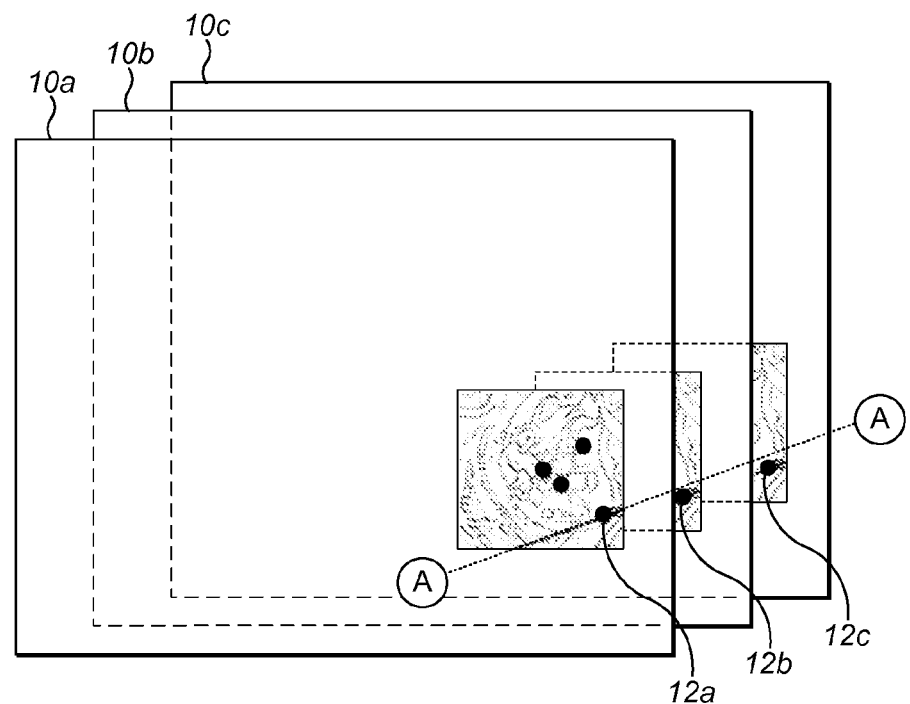
FIG. 1a shows positional movement in keypoint location in consecutive frames.
Figure 1B:
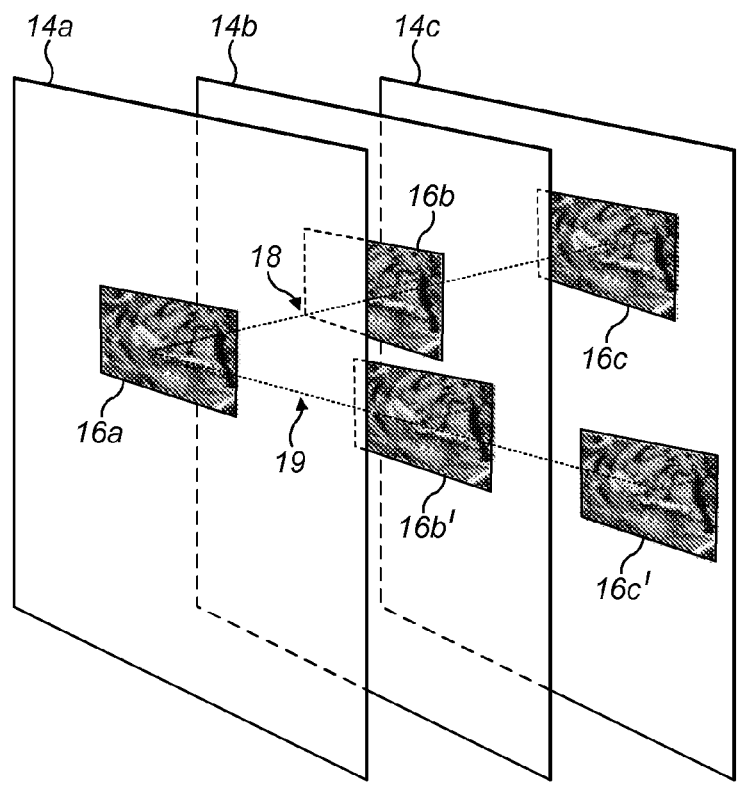
FIG. 1b shows two possible motion paths of an image patch in consecutive frames.
Figure 1C:
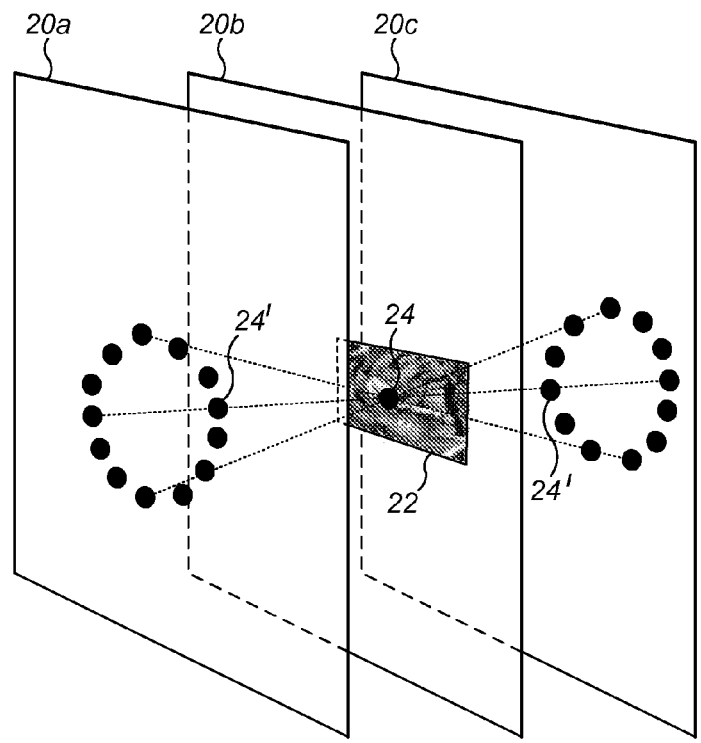
FIG. 1c shows a possible motion path along a bi-conical surface in consecutive frames.
Figure 2:
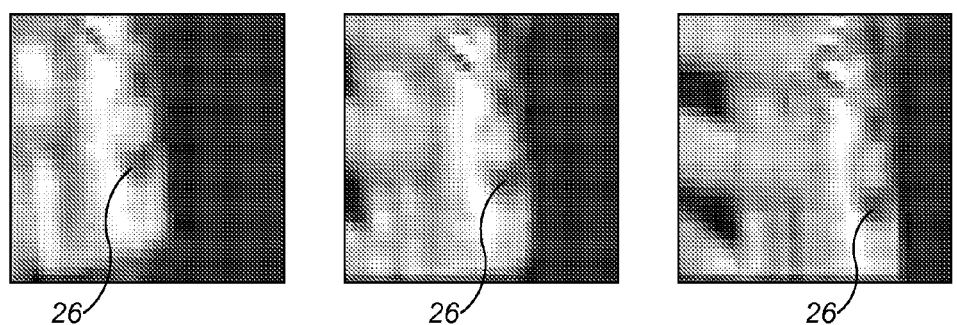
FIG. 2 shows consecutive images of a video sequence illustrating fine variability.
Figure 3:
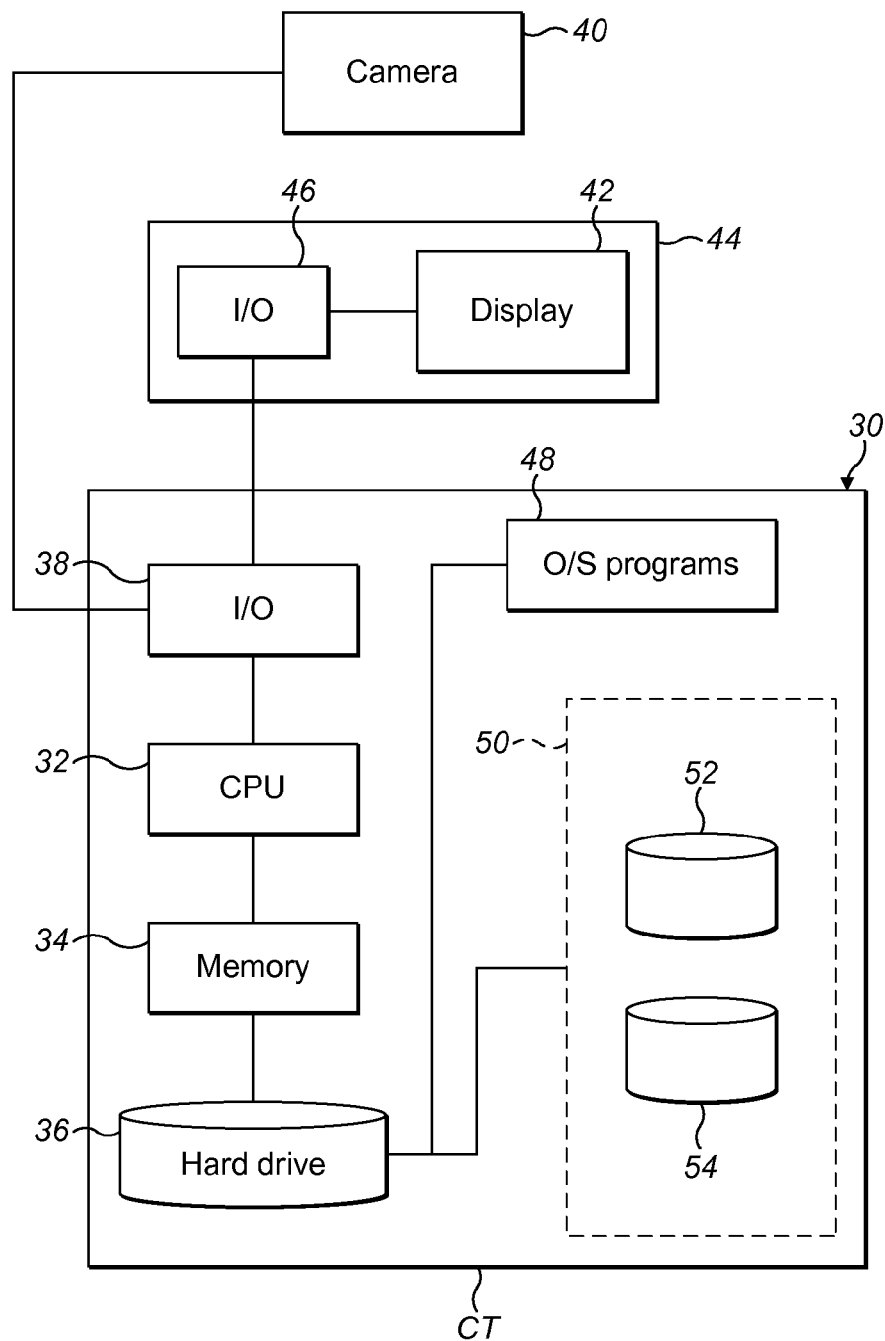
FIG. 3 shows schematically apparatus for performing the method of the present invention.

FIG. 3 shows schematically apparatus 30 arranged to perform the method of the invention. The apparatus 30 includes a computer terminal CT which includes a central processing unit (CPU) 32, memory 34, a data storage device such as a hard disc drive 36 and I/O devices 38 which facilitate interconnection of the computer CT with an optional image capture device such as a camera 40 arranged to record image data. Alternatively, the CT may be arranged to receive image data from a remote image data source such as an image database.

The I/O devices 38 further facilitate interconnection of a display element 42 of a screen 44 via a screen I/O device 46. Operating system programs 48 are stored on the hard disc drive 36 and control, in a known manner, low level operation of the computer terminal CT. Program files and data 50 are also stored on the hard disc drive 36, and control, in a known manner, outputs to an operator via associated devices and output data stored on the hard disc drive 36. The associated devices include the display 42 as an element of the screen 44, a pointing device (not shown) and keyboard (not shown), which receive input from, and output information to, the operator via further I/O devices (not shown). Included in the program files 50 stored on the hard drive 36 is a database 52 for storing image data and data related to the image data, including data related to the characteristics described further below, and a database 54 for storing data related to the template data, including the template data and data representative of a wavelet function for use in generating a keypoint descriptor.

Method of Generating a Keypoint Descriptor

An overview of methods according to embodiments of the present invention will first be given, with reference to FIG. 4 which is a flow diagram indicating the steps of the invention. This will be followed by a description of the steps in greater detail.

Figure 4:
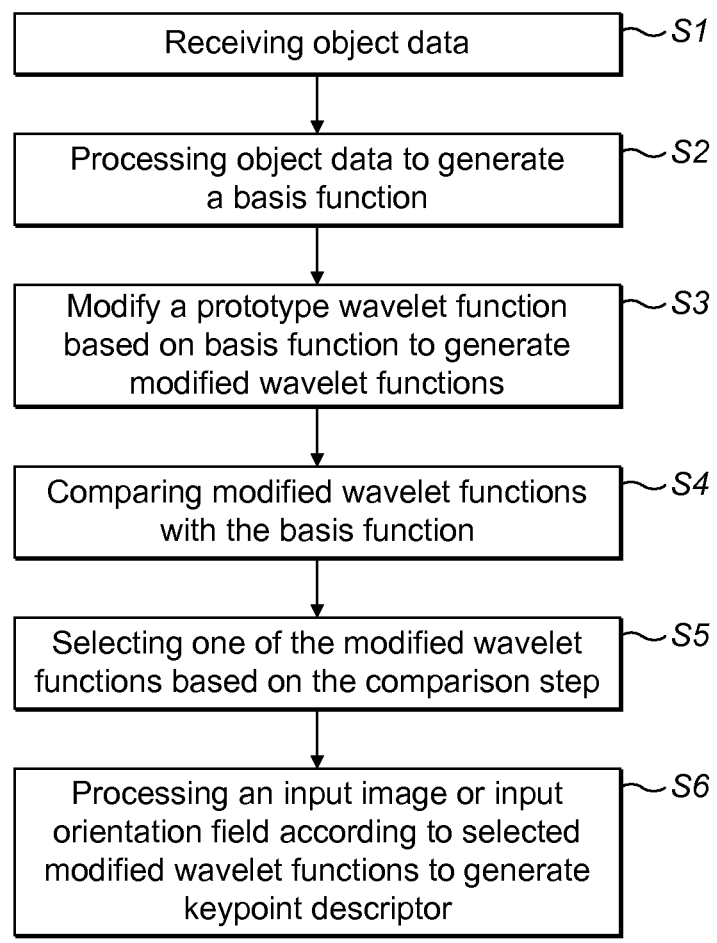
FIG. 4 shows a flow diagram giving an overview of the method of the present invention.

With reference to FIG. 4, object data representative of an object for identification in an image is received, in step S1.

Next, the object data is processed to generate at least one basis function representative of a feature having undergone at least one transformation, in step S2. The transformation that the feature may have undergone is a geometric transformation for example: rotation, translation, skewing, scaling or any combination of these transformations. This basis function is an analytical expression that can be used to fine tune wavelet functions discussed in steps S3, S4 and S5 below. Further details of the steps involved in generating the basis function will be described later.

In step S3, a prototype wavelet function is either generated or retrieved from a data store and can be modified based on the at least one basis function generated in step S2 resulting in a plurality of modified wavelet functions. Further details on how the prototype wavelet function is generated will be explained later.

In step S4, the plurality of modified wavelet functions, generated in step S3, is compared with the basis function generated in step S2. The basis function may be an eigenfunction.

In step S5, a modified wavelet function of the plurality of modified wavelet functions generated in step S3 is selected based on the comparison performed in step S4.

In step S6, an input image or input orientation field is processed according to the selected modified wavelet function to generate a keypoint descriptor. The generated keypoint descriptor is substantially invariant to the transformation the feature has been subjected to in step S2, and can be used to assist in identifying an object in an image. The input image or input orientation field corresponds with image data representing at least part of an image for object identification, such as the image data referred to in the section below entitled "Identification of an Object in an Image".

It will be appreciated that the keypoint descriptor generated may be stored in a database with a number of other keypoint descriptors that can then be used for identifying an object in an image.

In the detailed description below, reference is made to the method of generating a space-time invariant keypoint descriptor that can be used, for example, to identify features in video. However it will be appreciated that this method can be also applied used for identifying an object in a single two dimensional image.

Generate at Least One Basis Function

Figure 5:
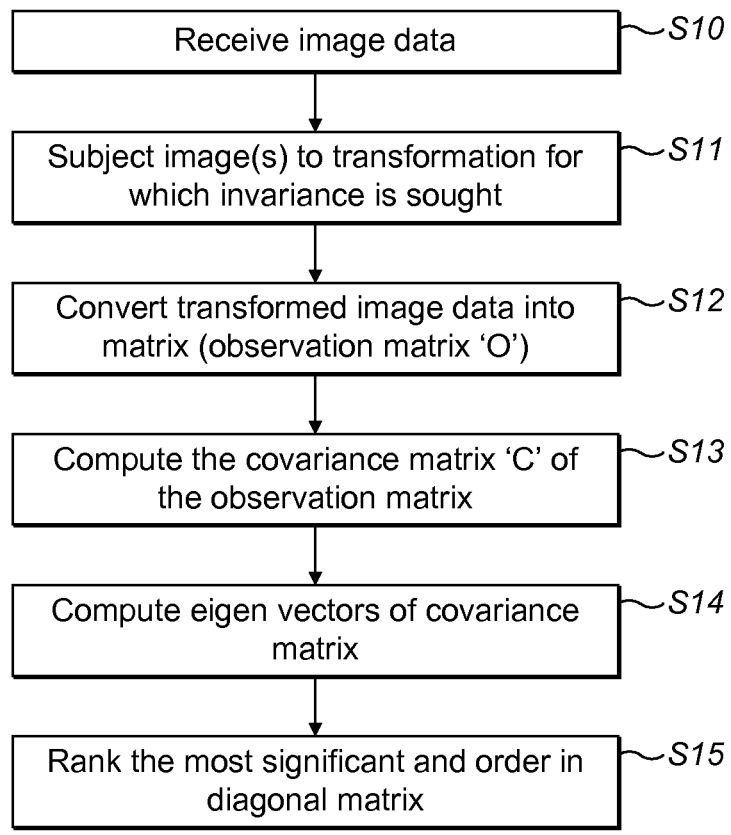
FIG. 5 shows a flow diagram giving an overview of generation of a basis function.

Referring to FIG. 5, generation of the basis function starts by receiving image data at step S10. This step involves obtaining examples of image patches or space-time image patches, for two-dimensional images or three-dimensional volumetric data respectively, that are representative of the type of visual information that is being analysed. The types of visual data often vary in resolution and statistics from one type of visual source to another. A "gross" example is the case of colour versus black and white imagery; internet streaming resolution versus High Definition broadcast; or natural images versus man-made images.

The next step, step S11, requires the generation of examples of the types of transformation for which invariance is sought. In the example shown below, there are two distinct cases of this process—one pertaining to rotation, and the other pertaining to rotation and scale. This process is performed using standard approaches which require (i) geometric transformation of coordinates of the standard space and time grid coordinates used in the representation of a discrete image sequence in accordance with the desired transform; and (ii) interpolation of the values from the transformed coordinate locations back to the standard grid used to represent discrete image sequences by trilinear, or other interpolation.

A set of space-time sequences, which are each a sequence of images spaced over time, may be referred to as an exemplar image or video stack. Each sequence of frames in the exemplar image stack should be at least as large as the example patch when scaled and/or rotated so that it is of maximum size. All image patches should be re-sized (zero-padded) to this size by placing the transformed sequences within an empty image sequence matrix. In this way, all exemplars will have the same pixel dimensions, denoted by $N_x \times N_y \times N_t$; in a preferred embodiment, $N_x$ and $N_y$ are both odd values.

In step S12, the exemplar image stack is converted into a matrix. This is achieved by re-ordering the images into vectors of dimensions $N_x N_y N_t \times 1$, and stacking these vectors into the rows of a matrix of dimensions $N_x N_y N_t \times M$, where M represents the number of exemplar images used. Ideally a large number of exemplars of the same order of magnitude as the number of dimensions of the image patch, e.g. 225, are used. In practice, the technique will work with as few as $\frac{1}{10}^{th}$ the number of exemplars (M) as pixels ($N_x N_y N_t$). This matrix is called the observations matrix, O.

In step S13, the covariance $N_x N_y N_t \times N_x N_y N_t$ matrix, C, of the observations matrix, O, is next computed.

In step S14, the eigenvectors of C are found by singular value decomposition. The result of singular value decomposition (SVD) of a matrix C is usually denoted by equation 1:

$$[U,S,V]=svd(C) \qquad (1)$$

The eigenvectors of C are stored in the columns of V. Each eigenvector is an orthogonal basis function that, when scaled to the corresponding diagonal eigenvalue entries of S, can be used to reconstruct C.

In step S15, the eigenvectors associated with the most significant J eigenvalues, typically identified by the magnitude of positive eigenvalues, are sought by ranking the order of the values in diagonal matrix S (if not already sorted), where J is the total number of eigenvalues/vectors defined in this step. Therefore, if sorted in descending order in magnitude, starting from the largest, the top J eigenvalues associated with the top J eigenvectors are used as prototype functions from which to construct an analytic descriptor or wavelet function.

Construct Prototype Wavelet Function

In this embodiment, the next step of the process is to construct or generate the prototype wavelet function, in this example quaternion wavelet functions. In other embodiments, the prototype wavelet function may be retrieved from a data store. This step requires the specification of analytic expressions that can be used to modify and therefore fine-tune the wavelet function. In this embodiment the quaternion wavelet function is a three dimensional (3D) quaternion wavelet function.

For each of the J top descriptor basis functions a prototype quaternion wavelet function $\hat{\psi}_k(d,\theta,\phi)$ is constructed. The purpose of the approximating wavelet function is to simplify the parameterisation and specification of the descriptor, and to provide better invariance properties than can be achieved from eigendecomposition alone.

Figure 6:
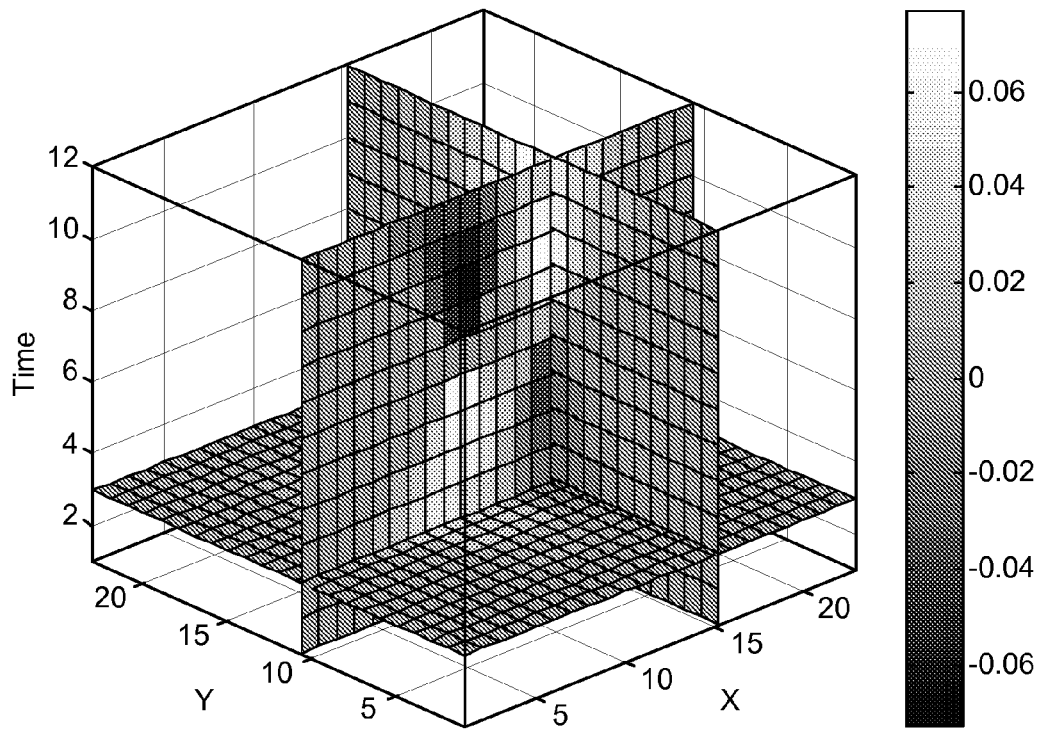
FIG. 6 shows a representation of an eigenvector basis function for a particular transformation.

For example, referring to FIG. 6 an eigenvector is shown as a space-time pattern, where x and y axes define a two-dimensional space, and a third, perpendicular, time axis is also shown; this eigenvector is insufficiently smooth for use as a basis for generating a keypoint descriptor and in itself does not yield an invariant descriptor, but it provides some information allowing the setting of wavelet function parameters appropriately.

Figure 7:
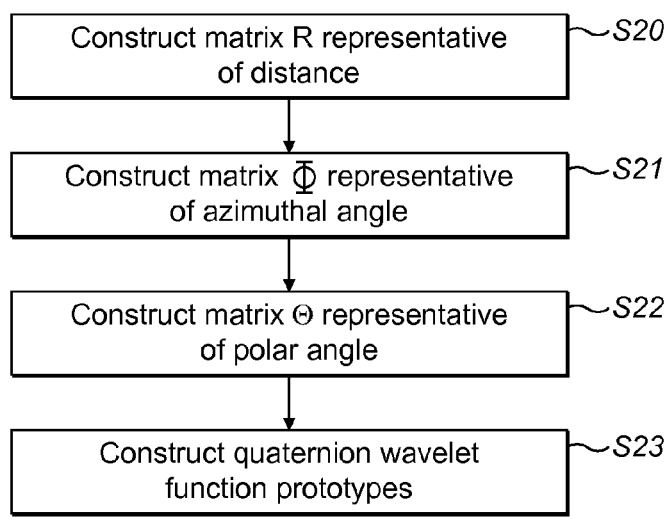
FIG. 7 shows a flow diagram giving an overview of generation of wavelet prototypes.

Referring now to FIG. 7, which provides an overview of how to create the prototype wavelet functions, in step S20, a three-dimensional matrix, D, is constructed whose elements, $d_{pqr}$, represent the Euclidean distance of each element to the central element of the matrix, the matrix elements being implicitly assigned spatial locations which are the row column and slice plane numbers of the matrix. The dimensions of matrix D should be of the order of the neighbourhood, within a single scale, over which one would wish to compute a descriptor.

In step S21, a three-dimensional matrix, $\Phi$, is constructed, whose elements, $\phi_{pqr}$, represent the azimuthal angle of the position of each element in a spherical coordinate system centered on the central element of the matrix, the matrix elements being implicitly assigned spatial locations which are the row column and slice plane numbers of the matrix. The dimensions of matrix $\Phi$ should be of the same size as D.

In step S22, a three-dimensional matrix $\Theta$, is constructed, whose elements, $\theta_{pqr}$, represent the polar angle of the position of each element in a spherical coordinate system centered on the central element of the matrix, the matrix elements being implicitly assigned spatial locations which are the row column and slice plane numbers of the matrix. The dimensions of matrix $\Theta$ should be the same size as D.

Figure 8A:
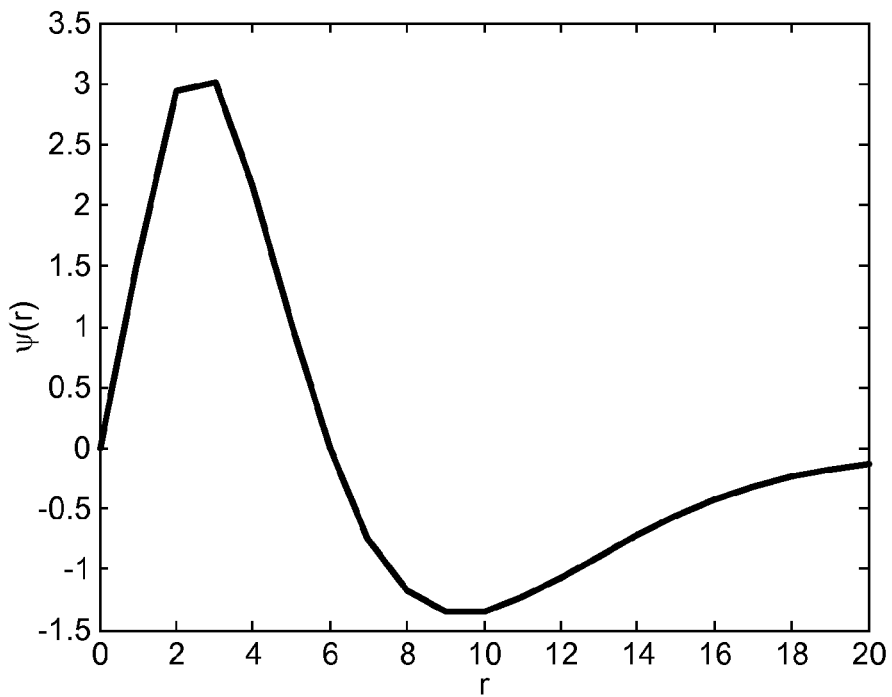
FIGS. 8a and 8b show diagrammatically radial decay functions that can be applied to a radial element of the present invention.
Figure 8B:
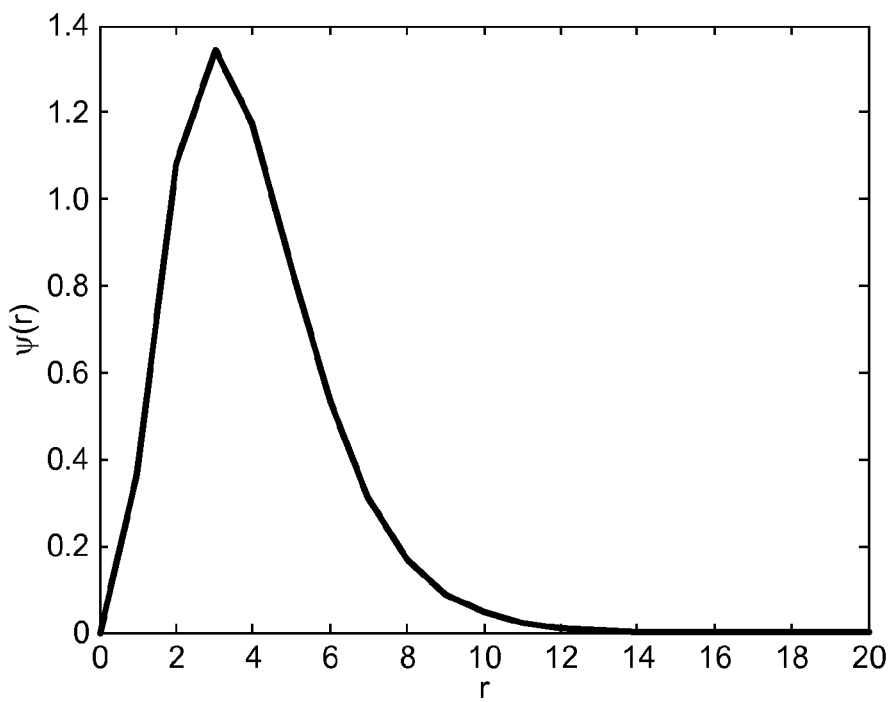

In step S23, a set of complex, polar separable wavelet function prototypes are constructed, each being in the form of equation 2:

$$\Psi_k(d,\theta,\phi) = d^{n_k-1} e^{-\alpha_k d}(n_k - \alpha_k d) \cdot (\cos(m_k \theta) + q_x \sin(m_k \theta)) \cdot (\cos(l_k \phi) + q_y \sin(l_k \phi)) \quad (2)$$

where the term $\psi_k$ denotes a wavelet function; $d^{n_k-1} e^{-\alpha_k d}(n_k - \alpha_k d)$ is the radial distance component with radial distance d, the term $(\cos(m_k \theta) + q_x \sin(m_k \theta))$ is the azimuthal angle component with azimuthal angle $\theta$, and the term $(\cos(l_k \phi) + q_y \sin(l_k \phi))$ is the polar angle component with polar angle $\phi$, and where the terms $q_x$ and $q_y$ denote the unit quaternions and obey the rules $q_x^2 = q_y^2 = q_z^2 = -1$, and $q_x q_y = q_z$. The parameters of the kth wavelet functions are $l_k$, $m_k$, $n_k$ and $\alpha_k$. In equation 2 the radial distance component has a non-linear weighting so as to have good localisation performance to a specific image region/patch around a keypoint. The radial distance component $d^{n_k-1} e^{-\alpha_k d}(n_k - \alpha_k d)$ represents a radial decay which tapers and is graphically illustrated in FIG. 8a. An alternative radial distance component could be $d^{n_k} e^{-\alpha_k d}$ which is graphically represented in FIG. 8b.

These radial distance components restricts the descriptor outputs to pertain only to the neighbourhood around the keypoint.

Modify Prototype Wavelet Function

The parameters of $n_k > 1$, $\alpha_k > 0$, and $m_k$ (integer) and $l_k$, integer, are modified so as to select a subset of descriptor wavelet functions to minimise the difference between evaluations of $\psi_k(d,\theta,\phi)$ at the locations defined by matrices D, $\Theta$ and $\Phi$ at each of the basis functions, referred to by index k and each member, j, of the set of J space-time eigenvectors determined using equation 3:

$$\alpha_k, m_k, n_k, l_k = \underset{\substack{\alpha_k, m_k, n_k, l_k \\ v=0,1,2,3}}{\arg\min} \left[ \left\| \text{Re}\{S(v) \hat{\psi}_k(d,\theta,\phi; n_k, m_k, l_k, \alpha_k)\} - \psi_j \right\|_2 \right] \quad (3)$$

where $$S(v) = \delta(v) - \delta(z-1)q_x - \delta(v-2)q_y - \delta(v-3)q_z$$

Where $\|\text{Re}\{S(v)\hat{\psi}_k(d,\theta,\phi;n_k,m_k,l_k,\alpha_k)\} - \psi_j\|_2$ denotes find the square root of the sum of the squares of the function $f(n_k,m_k,l_k,\alpha_k) = \text{Re}\{S(v)\hat{\psi}_k(d,\theta,\phi;n_k,m_k,l_k,\alpha_k)\} - \psi_j$ evaluated at predetermined discrete locations of d, $\theta$ and $\phi$ for the candidate values of $(n_k,m_k,l_k,\alpha_k)$. Equation 3 is an exemplary search term, and finds any value of the terms $\alpha_k, m_k, n_k, l_k$ of the quaternion components so that the quaternion function matches most closely the current $j^{th}$ eigenfunction. In this way, the parameters of the quaternion wavelet function can be tuned to match in the best manner the learned eigenfunctions whilst still retaining the attraction of an analytic description of the quaternion i.e. ease of specification and analytic invariance to a geometric transformations, such as rotation in the spatial plane and approximate invariance to rotation in the (2D+1) space-time direction.

Selecting a Modified Wavelet Function

Figure 9:
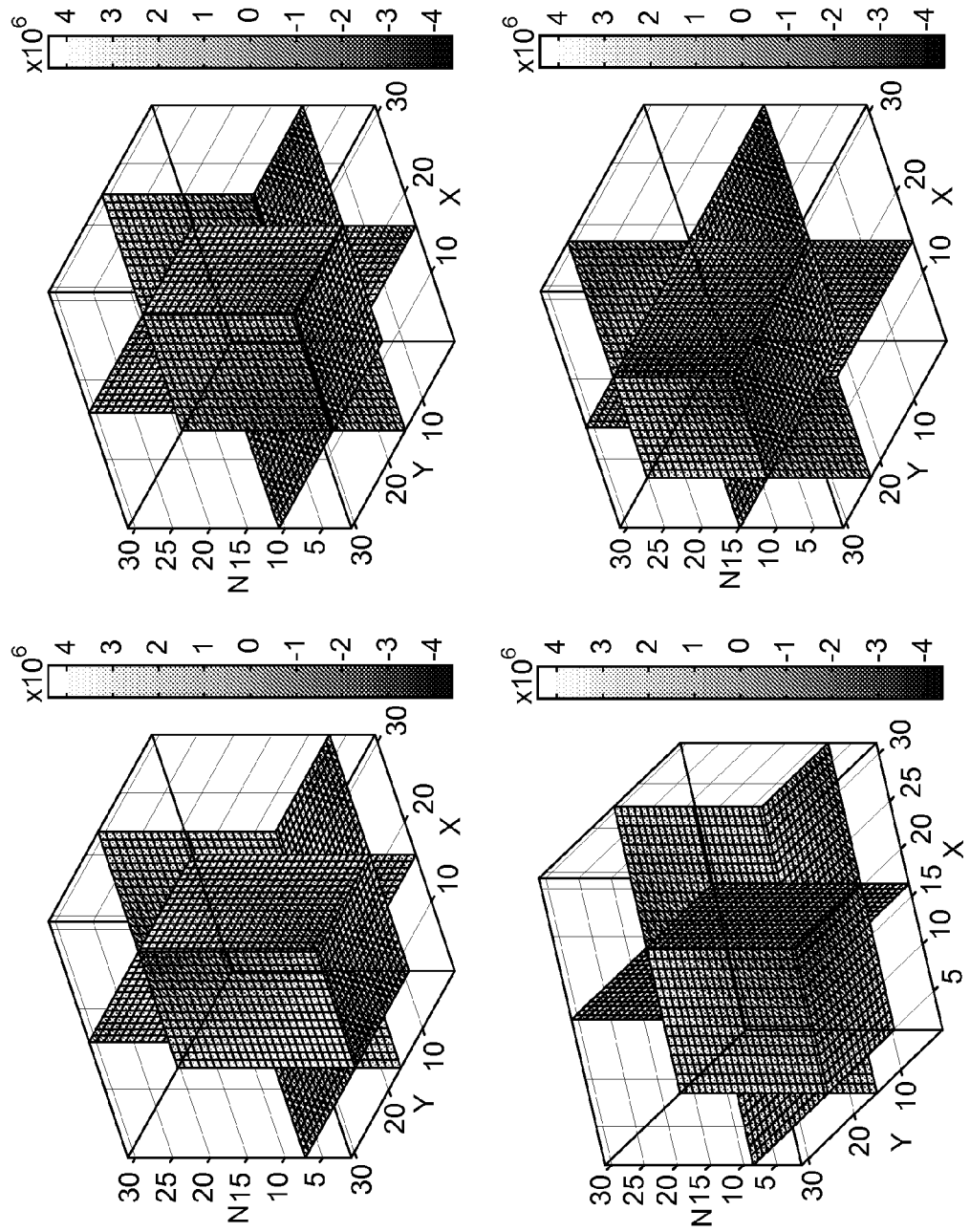
FIG. 9 shows a representation of a quaternion wavelet function according to an embodiment of the present invention.
Figure 10A:
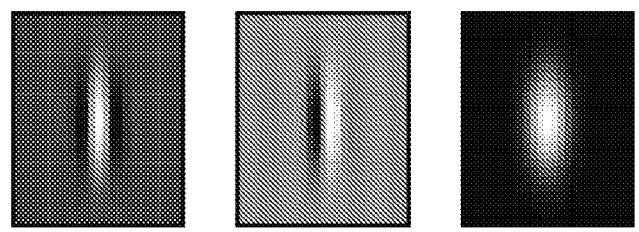
FIG. 10a shows representation of phase quadrature phase invariant receptive field models according to an embodiment of the present invention.
Figure 10B:
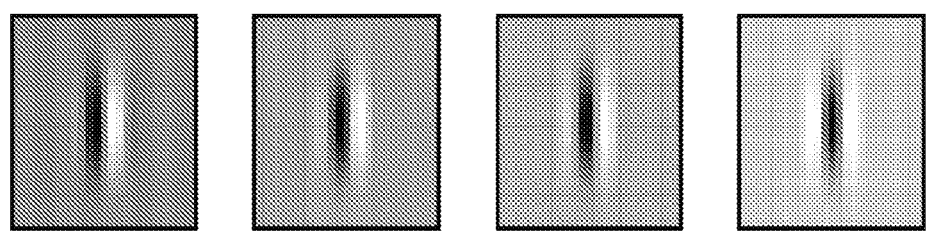
FIG. 10b shows representations of adapting (steering) phase response; according to an embodiment of the present invention
Figure 10C:
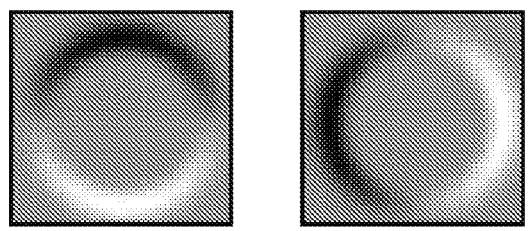
FIG. 10c shows representations of kernels used for response grouping according to an embodiment of the present invention.
Figure 10D:
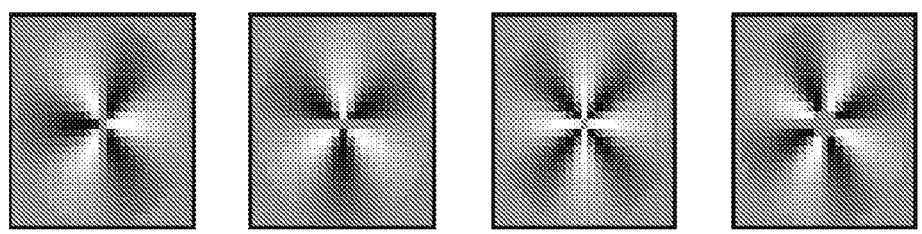
FIG. 10d shows representations of kernels used as bases to generate rotation invariant descriptors according to an embodiment of the present invention.

A matching criteria is applied to the plurality of modified wavelet functions in order to compare each of the modified wavelet functions with each of the at least one generated basis functions. Using the matching criteria, e.g. Euclidean distance, at least one closest matching modified wavelet function is selected for each of the number of the plurality of generated basis functions. This yields J sets of 4 parameters $\alpha_k, m_k, n_k, l_k$, one set of 4 parameters for each value of J. These 4J parameters are used to construct J quaternion wavelet functions. An example of the four components of one such quaternion wavelet function is shown in the FIG. 9. Note that each wavelet function is a three dimensional quaternion function defined over an $N_x \times N_y \times N_t$ grid.

Generate Keypoint Descriptor

In embodiments of the invention, the keypoint descriptor is generated or constructed by taking a set of modified quaternion wavelet functions selected from the previous step and then calculating the inner product between each of the selected modified quaternion wavelet functions and the input image, for example each of the image patch sequences, or the orientation field, to be characterised. If J quaternion wavelet functions are generated, then the keypoint descriptor consists of J quaternion wavelet function coefficients, $\sigma r_j$. Due to the properties of the quaternion wavelet functions, the magnitude of each coefficient will have substantial invariance to rotation in the plane and to patch velocity, that is to say an invariance to a change of position of an image patch spaced over time. These wavelet function coefficients are placed into the elements of a descriptor vector to form the keypoint descriptor.

Performance of a three-dimensional descriptor may be compromised if the patch velocity becomes too high. The reasons are (i) the approximation of linear motion (conical space-time geometry) by a spherical geometry breaks down, and (ii) the degree of velocity-induced pixel blurring reduces the stability of the visual structure. Nevertheless, the descriptors generated using the present invention represent a significant improvement over the stability of single-frame descriptors under conditions of moderate patch velocities.

Generating a Keypoint Descriptor for Two Dimensions

Referring to equation 2 above it will be noted that $d^{n_k-1}e^{-\alpha_k d}(n_k-\alpha_k d)$ is the radial distance component with radial element d, the term $(\cos(m_k\theta)+q_x \sin(m_k\theta))$ is the azimuthal angle component with azimuthal angle $\theta$, and the term $(\cos(l_k\phi)+q_y \sin(l_k\phi))$ is the polar angle component with polar angle $\phi$. Therefore, in further embodiments of the present invention, if a keypoint descriptor is required to be generated for identifying an object in a single frame, for example a two-dimensional object in a two-dimensional image, only the radial distance component and the azimuthal angle component are required to be used. For such embodiments, the method described previously is modified accordingly; therefore the prototype wavelet function and the plurality of modified wavelet functions generated in this instance will comprise a radial distance component d and an azimuthal angle $\theta$ having the formula:

$$\psi_k(d,\theta) = d^{n_k-1} e^{-\alpha_k d}(n_k - \alpha_k d) \cdot (\cos(m_k\theta) + q_x \sin(m_k\theta))$$

For such embodiments, examples of graphical representations of the wavelet functions are illustrated in FIGS. 10a to 10d which provide depictions of steering and some invariance properties.

Identifying an Object in an Image

In further embodiments of the invention, the keypoint descriptor generated according to the invention is used to process image data representing at least part of an image, such as an image patch, or a whole image, having an object for identification, to identify the object. Or, the descriptor's values may be used in different ways to aid patch recognition and characterisation.

An exemplary method for object identification in an image includes:

i) receiving image data representing at least part of an image having an object for identification;

ii) processing the image data to generate at least one keypoint descriptor representative of at least one keypoint of the image, for example using the technique described in the reference AA Bharath, N Kingsbury, "Phase Invariant Keypoint Detection", 15$^{th}$ International Conference on Digital Signal Processing, DSP 2007, the contents of which is incorporated herein by way of reference;

iii) comparing the keypoint descriptor generated in the method of the present invention with the at least one keypoint descriptor generated in step ii); and iv) determining if the at least one keypoint descriptor generated in step ii) matches the keypoint descriptor generated in the method of the present invention.

In exemplary embodiments, the comparing of step iii) above may be performed by using a calculated match metric. For example, similar to the matching of International patent application no. PCT/EP2007058547, the contents of which is incorporated herein by reference, the match metric may be based on a Euclidean distance, as is well known in the art. In accordance with the present invention, the Euclidean distance based match metric may be calculated between the keypoint descriptor generated in the method of the present invention and each keypoint descriptor generated in step ii). Each Euclidean distance based match metric calculated in step iii) in this way is thresholded using a threshold value that can for example be set by a user of image processing software. The threshold value is set for determining whether a keypoint descriptor generated in step ii) matches the keypoint descriptor generated in the method of the invention. For example, if the Euclidean distance based match metric between one of the keypoint descriptors generated in step ii) and the keypoint descriptor generated in the method of the invention has a value greater than the threshold, then it is determined that the keypoint descriptor generated in step ii) in question matches the keypoint descriptor generated in the method of the invention. Such a match indicates, with high probability, that part of the object for identification has been successfully identified. If, however, the calculated Euclidean distance based match metric is lower than the threshold, then there is no match, indicating that the target object has not been identified. If more than one Euclidean distance match metric is greater than the threshold, then the greatest Euclidean distance match metric may be taken as the closest match, indicating that the keypoint descriptor corresponding with the greatest Euclidean distance match metric best matches the keypoint descriptor generated in the present invention. At least one verification process may be applied also, to ensure that a match makes geometric sense.

In such a method of object identification, in accordance with embodiments of the invention, transformation parameters of the object in the input image or orientation field may be estimated from the keypoint descriptor generated in the method of the invention. For example, if one wishes to estimate the direction of object motion in three dimensional space, this is approximated for small velocities by taking the ratio of the different components of the quaternion σj corresponding to a wavelet function $\hat{\psi}_1(d,\theta,\phi;n_k,1,1,\alpha_k)$. For example, if the components of this coefficient are represented in equation 4

$$\sigma_1 = \sigma + \sigma_x q_x + \sigma_y q_y + \sigma_z q_z \qquad (4)$$

then the ratio $\sigma_z/\sigma_y$ gives the tangent of the angle $\phi$, which is strongly related to the direction of the motion of the patch in space. Similarly, the tangent of the dominant angle of an elongated object may be estimated by taking the ratio $\sigma_x/\sigma$. If desired, the latter may be used to replace the angle description of the prior art SIFT approach for 2D, though the SIFT technique has no analogue for the former.

Alternatively, the magnitude of each quaternion coefficient may be used for matching. If a 5×1 space-time keypoint descriptor is represented as $[\sigma_1, \sigma_2, \sigma_3, \sigma_4, \sigma_5]$, then the rotation and motion invariant keypoint descriptor may be constructed as $[|\sigma_1|, |\sigma_2|, |\sigma_3|, |\sigma_4|, |\sigma_5|]$. This may be used for tracking or object recognition applications as described in International patent application No. PCT/EP2007058547 the contents of which are included herein by reference.

In further embodiments of the invention, the transformation parameters may be used to track a keypoint in subsequent frames such that further occurrences of the keypoint will have small changes to the transformation parameters from frame to frame. Such a tracking of keypoints can provide better estimates of overall object motion and rotation and also of keypoint stability.

The above embodiments are to be understood as illustrative examples of the invention. Further embodiments of the invention are envisaged. For example, other quaternion wavelet functions may be added or replaced based on considerations of performance and available computing resources. For example, if for a pair of selected modified wavelet functions, $\hat{\psi}_{j=2}(d,\theta,\phi)$ and $\hat{\psi}_{j=5}(d,\theta,\phi)$, the shapes of these wavelet functions (determined by pair of the 4-parameter sets) are found to be very similar, one of the wavelet functions may either be removed, or replaced by a different parameter set. Instead of applying the quaternion descriptor to the pixel values themselves, in an alternative embodiment, tolerances to illumination changes may be attained by applying the descriptor to the orientation dominance field described in patent application PCT/EP2007058547 the contents of which are included herein by reference. If this type of descriptor is selected, then the learning steps described above, the pixel values of the image should be replaced by its corresponding orientation dominance field represented as x and y components (preferably not real-imaginary representation). This method may also be used to generate keypoint descriptors that may be used to identify a three dimensional object in a three dimensional image.

Similar as with the case of SIFT descriptors known from the prior art, descriptor matching between descriptors computed in a captured image and those descriptors held in a database, in accordance with the present invention, can be made more efficient by utilising an inverted file structure (see journal article entitled "Video Google: Efficient Visual Search of Videos" by Sivic & Zisserman, 2003, Department of Engineering Science, University of Oxford, the contents of which is incorporated by reference) to rank the most relevant descriptors and/or images contained in one or more databases before those that are less relevant. A preferred embodiment of this would incorporate TF-IDF (Term Frequency, Inverse Document Frequency) weighting and hierarchical clustering to generate the "visual words" necessary for such an approach (see journal article entitled "Scalable Recognition with a Vocabulary Tree" by Nister & Stewenius, 2006, Department of Computer Science, University of Kentucky, the contents of which is incorporated by reference).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of generating a keypoint descriptor for identifying an object in an image or in a sequence of images, the keypoint descriptor being substantially invariant to a transformation of the object in the image, wherein the method is performed using processing apparatus and includes:
   a) receiving object data representing an object for identification in an image;
   b) processing said object data to generate at least one basis function representing a feature having undergone at least one transformation or a transformation sequence across several consecutive frames, optionally using transformations that are out of the image plane to recognize objects from multiple views;
   c) modifying a prototype wavelet function based on said at least one basis function to generate a plurality of modified wavelet functions;
   d) comparing the plurality of modified wavelet functions with the at least one basis function;
   e) selecting a modified wavelet function of said plurality of modified wavelet functions based on the comparison of step d); and
   f) processing an input image or input orientation field according to said selected modified wavelet function to generate the keypoint descriptor,
   wherein the prototype wavelet function and the plurality of modified wavelet functions comprise a radial distance component and an azimuthal angle component,
   wherein the prototype wavelet function and the plurality of modified wavelet functions have the formula:

$$\Psi_k(d,\theta) = d^{n_k-1} e^{-\alpha_k d}(n_k - \alpha_k d) \cdot (\cos(m_k\theta) + q_x \sin(m_k\theta))$$

where the term $d^{n_k-1} e^{-\alpha_k d}(n_k - \alpha_k d)$ is the radial distance component and the term $(\cos(m_k\theta) + q_x \sin(m_k\theta))$ is the azimuthal angle component, and where the term $q_x$ denotes an imaginary unit.

2. A method according to claim 1, wherein the keypoint descriptor is arranged to identify an object in a single image.

3. A method according to claim 2, wherein the object is a two-dimensional or three-dimensional object in a two-dimensional image.

4. A method according to claim 1, wherein the prototype wavelet function and the modified wavelet functions comprise a non-linear weighting of the radial distance component.

5. A method according to claim 4, wherein the non-linear weighting represents a radial decay.

6. A method according to claim 1, wherein the prototype wavelet function and the modified wavelet functions are quaternion wavelet functions, the keypoint is arranged to identify an object in an image patch, the transformation comprises a rotation, the transformation comprises a translation, said at least one basis function is an eigenfunction, the object is a two-dimensional object in a temporal sequence of images or a three-dimensional object in three-dimensional volumetric data, or the modifying of step c) is performed in accordance with the formula:

$$\alpha_k, m_k, n_k, l_k = \underset{\substack{\alpha_k, m_k, n_k, l_k \\ v=0,1,2,3}}{\arg\min} \left[ \left\| \text{Re}\{S(v)\hat{\psi}_k(d,\theta,\phi; n_k, m_k, l_k, \alpha_k)\} - \psi_j \right\|_2 \right]$$

where $S(v) = \delta(v) - \delta(v-1)q_x - \delta(v-2)q_y - \delta(v-3)q_z$, and
where $\|\text{Re}\{S(v)\hat{\psi}_k(d,\theta,\phi; n_k, m_k, l_k, \alpha_k)\} - \psi_j\|_2$, denotes find the square root of the sum of the squares of the function $f(n_k, m_k, l_k, \alpha_k) = \text{Re}\{S(v)\hat{\psi}_k(d,\theta,\phi; n_k, m_k, l_k, \alpha_k)\} - \psi_j$, evaluated at predetermined discrete locations of d, $\theta$ and $\phi$ for candidate values of $(n_k, m_k, l_k, \alpha_k)$, and
where the terms $q_x$ and $q_y$ denote unit quaternions and obey the rules $q_x^2 = q_y^2 = q_z^2 = -1$, and $q_x \cdot q_y = q_z$.

7. A method according to claim 1, wherein the comparing of step d) includes matching at least one of the modified wavelet functions with said at least one basis function, and the selected modified wavelet function is selected in step e) according to matching criteria.

8. A method according to claim 7, wherein the processing of step b) includes generating a plurality of basis functions, the comparing of step d) includes matching a number of the plurality of basis functions with at least one of the modified wavelet functions, and the selecting of step e) includes selecting a modified wavelet function for each of the number of the plurality of basis functions according to matching criteria.

9. A method according to claim 8, wherein the keypoint descriptor is generated in step e) on the basis of the selected wavelet functions.

10. A method of identifying an object in an image, using processing apparatus, the method including processing image data representing at least part of said image with a keypoint descriptor generated using the method of claim 1.

11. A method according to claim 10, wherein the keypoint descriptor is a first keypoint descriptor, and including:
   i) receiving said image data;
   ii) processing said image data to generate at least one second keypoint descriptor representative of at least one keypoint of said image;
   iii) comparing the first keypoint descriptor with the at least one second keypoint descriptor; and
   iv) determining if said at least one second keypoint descriptor matches the first keypoint descriptor.

12. A method according to claim 10, the method including estimating transformation parameters of the object in the input image or input orientation field from the keypoint descriptor.

13. A method according to claim 12, the method including tracking at least one keypoint from one frame to another frame using the transformation parameters.

14. Processing apparatus arranged to perform the method of claim 10.

15. A computer program product comprising a non-transitory computer-readable storage medium having computer readable instructions stored thereon, the computer readable instructions being executable by a computerised device to cause the computerised device to perform the method of claim 10.

16. Processing apparatus arranged to perform the method of claim 1.

17. A computer program product comprising a non-transitory computer-readable storage medium having computer readable instructions stored thereon, the computer readable instructions being executable by a computerised device to cause the computerised device to perform the method of claim 1.

18. A method of generating a keypoint descriptor for identifying an object in an image or in a sequence of images, the keypoint descriptor being substantially invariant to a transformation of the object in the image, wherein the method is performed using processing apparatus and includes:
   a) receiving object data representing an object for identification in an image;
   b) processing said object data to generate at least one basis function representing a feature having undergone at least one transformation or a transformation sequence across several consecutive frames, optionally using transformations that are out of the image plane to recognise objects from multiple views;
   c) modifying a prototype wavelet function based on said at least one basis function to generate a plurality of modified wavelet functions;
   d) comparing the plurality of modified wavelet functions with the at least one basis function;
   e) selecting a modified wavelet function of said plurality of modified wavelet functions based on the comparison of step d); and
   f) processing an input image or input orientation field according to said selected modified wavelet function to generate the keypoint descriptor,
   wherein the object is a three dimensional object in a three dimensional image or the keypoint descriptor is arranged to identify an object in a series of images spaced over time,
   wherein the prototype wavelet function and the plurality of modified wavelet functions comprise a radial distance component, an azimuthal angle component and a polar angle component,
   wherein the prototype wavelet function and the plurality of modified wavelet functions have the formula:

$$\Psi_k(d,\theta,\phi,)=d^{n_k-1}e^{-\alpha_k d}(n_k-\alpha_k d)\cdot(\cos(m_k\theta)+q_x\sin(m_k\theta))\cdot(\cos(l_k\phi)+q_y\sin(l_k\phi))$$

where the term $d^{n_k-1}e^{-\alpha_k d}(n_k-\alpha_k d)$ is the radial distance weighting component with radial distance, d, the term $(\cos(m_k\theta)+q_x, \sin(m_k\theta))$ is the azimuthal angle component with azimuthal angle $\theta$, and the term $(\cos(l_k\phi)+q_y\sin(l_k\phi))$ is polar angle component with polar angle $\phi$, and where the terms $q_x$ and $q_y$ denote unit quaternions and obey the rules $q_x^2=q_y^2=q_z^2=-1$, and $q_x, q_y=q_z$.

19. A method according to claim 18, wherein the prototype wavelet function and the modified wavelet functions comprise a non-linear weighting of the radial distance component.

20. A method according to claim 19, wherein the non-linear weighting represents a radial decay.

21. A method according to claim 18, wherein the prototype wavelet function and the modified wavelet functions are quaternion wavelet functions, the keypoint is arranged to identify an object in an image patch, the transformation comprises a rotation, the transformation comprises a translation, said at least one basis function is an eigenfunction, the object is a two-dimensional object in a temporal sequence of images or a three-dimensional object in three-dimensional volumetric data, or the modifying of step c) is performed in accordance with the formula:

$$\alpha_k, m_k, n_k, l_k = \underset{\substack{\alpha_k m_k, n_k l_k \\ v=0,1,2,3}}{\operatorname{argmin}} \lfloor \|\operatorname{Re}\{S(v)\hat{\Psi}_k(d,\theta,\phi;n_k,m_k,l_k,\alpha_k)\}-\Psi_j\|_2 \rfloor$$

where $S(v)=\delta(v)-\delta(v-1)q_x-\delta(v-2)q_y-\delta(v-3)q_z$, and
where $\|\operatorname{Re}\{S(v)\hat{\psi}_k(d,\theta,\phi;n_k,m_k,l_k,\alpha_k)\}-\psi_j\|_2$, denotes find the square root of the sum of the squares of the function $f(n_k,m_k,l_k,\alpha_k)=\operatorname{Re}\{S(v)\hat{\psi}_k(d,\theta,\phi;n_k,m_k,l_k,\alpha_k)\}-\psi_j$, evaluated at predetermined discrete locations of d, $\theta$ and $\phi$ for candidate values of $(n_k,m_k,l_k,\alpha_k)$, and
where the terms $q_x$, and $q_y$, denote unit quaternions and obey the rules $q_x^2=q_y^2=q_z^2=-1$, and $q_x, q_y=q_z$.

22. A method according to claim 18, wherein the comparing of step d) includes matching at least one of the modified wavelet functions with said at least one basis function, and the selected modified wavelet function is selected in step e) according to matching criteria.

23. A method according to claim 22, wherein the processing of step b) includes generating a plurality of basis functions, the comparing of step d) includes matching a number of the plurality of basis functions with at least one of the modified wavelet functions, and the selecting of step e) includes selecting a modified wavelet function for each of the number of the plurality of basis functions according to matching criteria.

24. A method according to claim 23, wherein the keypoint descriptor is generated in step e) on the basis of the selected wavelet functions.

25. A method of identifying an object in an image, using processing apparatus, the method including processing image data representing at least part of said image with a keypoint descriptor generated using the method of claim 18.

26. A method according to claim 25, wherein the keypoint descriptor is a first keypoint descriptor, and including:
   i) receiving said image data;
   ii) processing said image data to generate at least one second keypoint descriptor representative of at least one keypoint of said image;
   iii) comparing the first keypoint descriptor with the at least one second keypoint descriptor; and
   iv) determining if said at least one second keypoint descriptor matches the first keypoint descriptor.

27. A method according to claim 25, the method including estimating transformation parameters of the object in the input image or input orientation field from the keypoint descriptor.

28. A method according to claim 27, the method including tracking at least one keypoint from one frame to another frame using the transformation parameters.

29. Processing apparatus arranged to perform the method of claim 25.

30. A computer program product comprising a non-transitory computer-readable storage medium having computer readable instructions stored thereon, the computer readable instructions being executable by a computerised device to cause the computerised device to perform the method of claim 25.

31. Processing apparatus arranged to perform the method of claim 18.

32. A computer program product comprising a non-transitory computer-readable storage medium having computer readable instructions stored thereon, the computer readable instructions being executable by a computerised device to cause the computerised device to perform the method of claim 18.

33. A method of generating a keypoint descriptor for identifying an object in an image or in a sequence of images, the keypoint descriptor being substantially invariant to a transformation of the object in the image, wherein the method is performed using processing apparatus and includes:
- a) receiving object data representing an object for identification in an image;
- b) processing said object data to generate at least one basis function representing a feature having undergone at least one transformation or a transformation sequence across several consecutive frames, optionally using transformations that are out of the image plane to recognise objects from multiple views;
- c) modifying a prototype wavelet function based on said at least one basis function to generate a plurality of modified wavelet functions;
- d) comparing the plurality of modified wavelet functions with the at least one basis function;
- e) selecting a modified wavelet function of said plurality of modified wavelet functions based on the comparison of step d); and
- f) processing an input image or input orientation field according to said selected modified wavelet function to generate the keypoint descriptor, wherein the prototype wavelet function and the modified wavelet functions are quaternion wavelet functions, the keypoint is arranged to identify an object in an image patch, the transformation comprises a rotation, the transformation comprises a translation, said at least one basis function is an eigenfunction, the object is a two-dimensional object in a temporal sequence of images or a three-dimensional object in three-dimensional volumetric data, or the modifying of step c) is performed in accordance with the formula:

$$\alpha_k, m_k, n_k, l_k = \underset{\substack{\alpha_k m_k, n_k l_k \\ v=0,1,2,3}}{\operatorname{argmin}} \left[ \left\| \operatorname{Re}\{S(v)\hat{\Psi}_k(d, \theta, \phi; n_k, m_k, l_k, \alpha_k)\} - \Psi_j \right\|_2 \right]$$

where $S(v)=\delta(v)-\delta(v-1)q_x-\delta(v-2)q_y, -\delta(v-3)q_z$, and, where $\|\operatorname{Re}\{S(v)\hat{\psi}_k(d,\theta,\phi;n_k,m_k,l_k,\alpha_k)\}-\psi_j\|_2$, denotes find the square root of the sum of the squares of the function $f(n_k,m_k,l_k,\alpha_k)=\operatorname{Re}\{S(v)\hat{\psi}_k(d,\theta,\phi;n_k,m_k,l_k,\alpha_k)\}-\psi_j$, evaluated at predetermined discrete locations of d, θ and φ for candidate values of $(n_k,m_k,l_k,\alpha_k)$, and where the terms $q_x$, and $q_y$, denote unit quaternions and obey the rules $q_x^2=q_y^2=q_z^2=-1$, and $q_x, q_y=q_z$.

34. A method according to claim 33, wherein the comparing of step d) includes matching at least one of the modified wavelet functions with said at least one basis function, and the selected modified wavelet function is selected in step e) according to matching criteria.

35. A method according to claim 34, wherein the processing of step b) includes generating a plurality of basis functions, the comparing of step d) includes matching a number of the plurality of basis functions with at least one of the modified wavelet functions, and the selecting of step e) includes selecting a modified wavelet function for each of the number of the plurality of basis functions according to matching criteria.

36. A method according to claim 35, wherein the keypoint descriptor is generated in step e) on the basis of the selected wavelet functions.

37. A method of identifying an object in an image, using processing apparatus, the method including processing image data representing at least part of said image with a keypoint descriptor generated using the method of claim 33.

38. A method according to claim 37, wherein the keypoint descriptor is a first keypoint descriptor, and including:
- i) receiving said image data;
- ii) processing said image data to generate at least one second keypoint descriptor representative of at least one keypoint of said image;
- iii) comparing the first keypoint descriptor with the at least one second keypoint descriptor; and
- iv) determining if said at least one second keypoint descriptor matches the first keypoint descriptor.

39. A method according to claim 37, the method including estimating transformation parameters of the object in the input image or input orientation field from the keypoint descriptor.

40. A method according to claim 39, the method including tracking at least one keypoint from one frame to another frame using the transformation parameters.

41. Processing apparatus arranged to perform the method of claim 37.

42. A computer program product comprising a non-transitory computer-readable storage medium having computer readable instructions stored thereon, the computer readable instructions being executable by a computerised device to cause the computerised device to perform the method of claim 37.

43. Processing apparatus arranged to perform the method of claim 33.

44. A computer program product comprising a non-transitory computer-readable storage medium having computer readable instructions stored thereon, the computer readable instructions being executable by a computerized device to cause the computerized device to perform the method of claim 33.

* * * * *